United States Patent [19]
Uematsu

[11] Patent Number: 5,266,993
[45] Date of Patent: Nov. 30, 1993

[54] FOCAL-PLANE SHUTTER APPARATUS

[75] Inventor: Kimio Uematsu, Tokyo, Japan

[73] Assignee: Nikon Corporation, Tokyo, Japan

[21] Appl. No.: 966,858

[22] Filed: Oct. 27, 1992

[30] Foreign Application Priority Data

Oct. 31, 1991 [JP] Japan .................. 3-286641
Nov. 15, 1991 [JP] Japan .................. 3-300611

[51] Int. Cl.$^5$ .................................. G03B 9/40
[52] U.S. Cl. ........................ 354/246; 354/248
[58] Field of Search ............... 354/245, 246, 247, 248, 354/249

[56] References Cited

U.S. PATENT DOCUMENTS

| | | | |
|---|---|---|---|
| 4,493,544 | 1/1985 | Uematsu | 354/246 |
| 4,814,807 | 3/1989 | Nakagawa et al. | 354/246 |
| 5,019,847 | 5/1991 | Tanabe | 354/246 |

FOREIGN PATENT DOCUMENTS

57-79929  5/1982  Japan .
61-84634  4/1986  Japan .
63-45540  3/1988  Japan .

Primary Examiner—Monroe H. Hayes
Attorney, Agent, or Firm—Shapiro and Shapiro

[57] ABSTRACT

A focal-plane shutter apparatus comprises a first plate located on a film-plane side of a mirror box, a second plate located on a film-plane side of the first plate, a third plate located on an opposite side of the first plate to the film-plane side thereof, a vane group comprising a plurality of light shielding thin plates contained between the first plate and the second plate, and a drive arm contained between the first plate and the second plate to drive the vane group, the third plate having a mount portion which is to be fixed to the first plate, a shaft fixed to the third plate, a shutter drive lever rotatably fit to the shaft at one end and connected to the drive arm at an other end, and an urging device for urging the shutter drive lever in a direction of drive of the vane group, in which the first plate has a support portion to support the one end of the shaft and a hole portion for transmitting a displacement of the shutter drive lever to the drive arm.

9 Claims, 6 Drawing Sheets

FOCAL-PLANE SHUTTER APPARATUS

BACKGROUND OF THE INVENTION

1. Field of the Invention

The present invention relates to a focal-plane shutter apparatus in a camera.

2. Related Background Art

Figure 1:
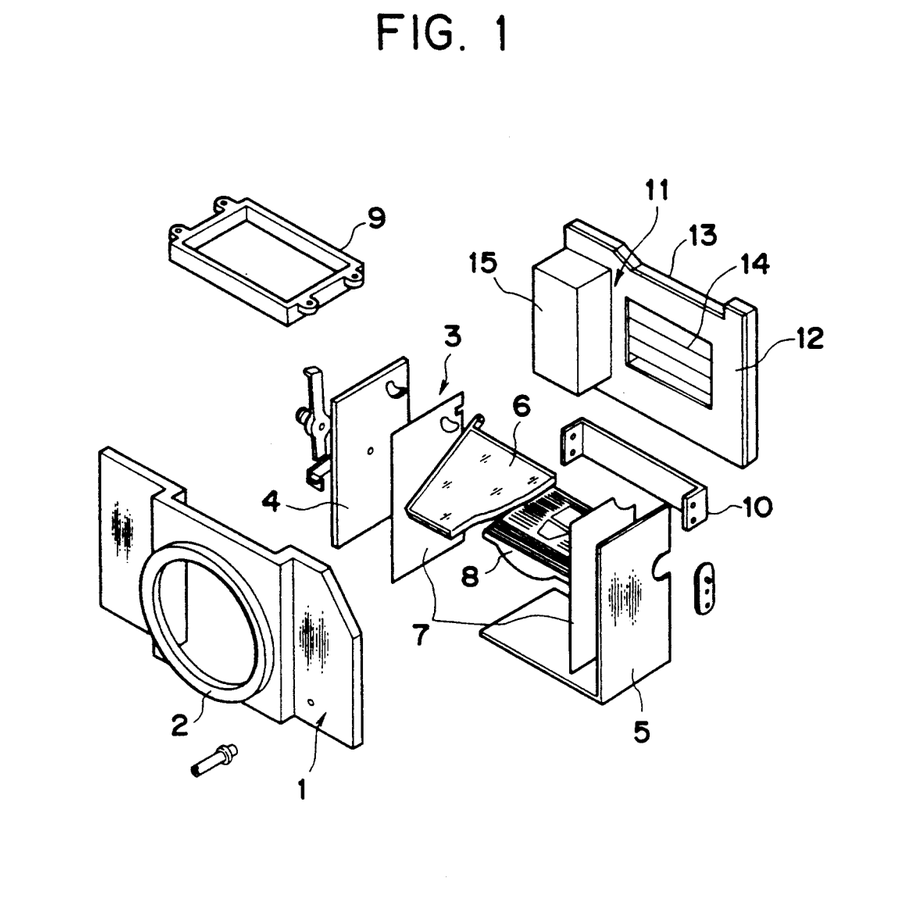
FIG. 1 is a perspective view to show a camera having a conventional focal-plane shutter apparatus.

FIG. 1 shows a camera having a conventional focal-plane shutter apparatus, in which numeral 1 denotes a front panel member on which a lens fitting mount 2 is formed.

A mirror box 3 is located behind the front panel member 1.

The mirror box 3 has a side face base plate 4 and a side-and-lower face base plate 5. A movable mirror 6 is located between these base plates 4 and 5.

Also, light shield sheets 7 and a light shield plate 8 are located in the mirror box 3.

The mirror box 3 is structured to be connected by an upper fixing member 9. Above the mirror box 3, there is a holding member 10 located for attachment of a finder optical system.

A focal-plane shutter apparatus 11 is located behind the mirror box 3.

The focal-plane shutter apparatus 11 has a first plate 12 and a second plate 13 located at a predetermined spacing to face each other. A vane group 14 comprising a plurality of light shielding thin plates is contained between the first plate 12 and the second plate 13.

A vane group drive mechanism 15 for driving the vane group 14 is located in front of the first plate 12.

Figure 2:
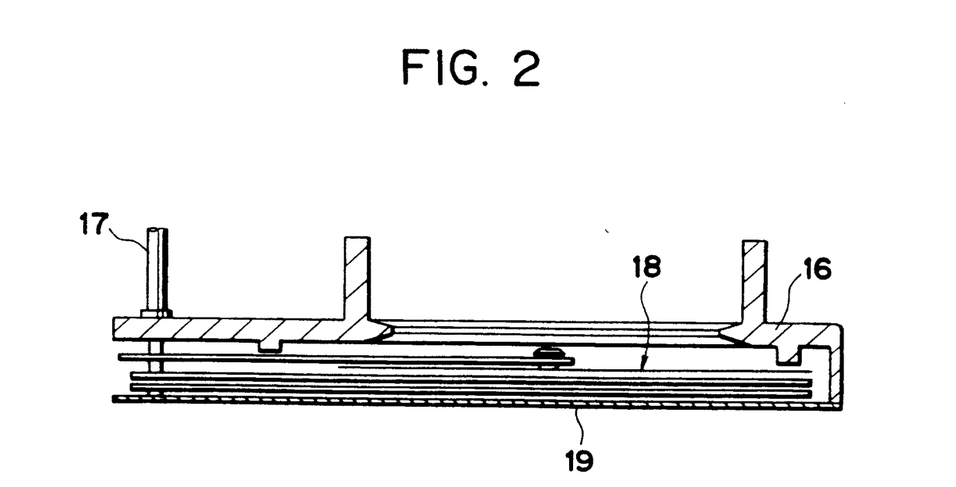
FIG. 2 is a cross-sectional view to show a conventional focal-plane shutter apparatus.
Figure 3:
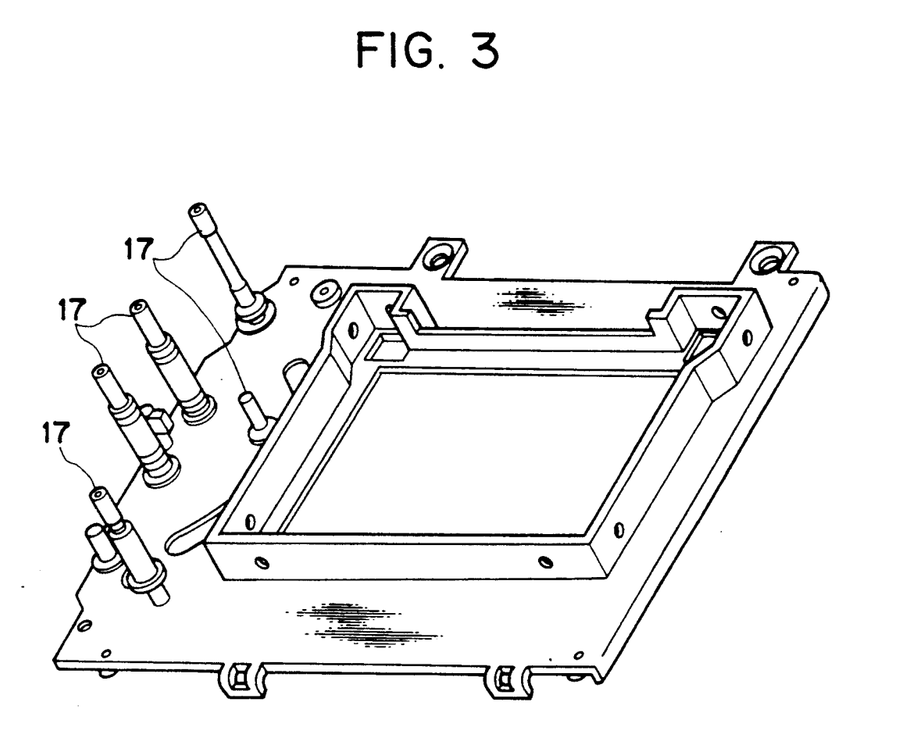
FIG. 3 is a perspective view to show a first plate in FIG. 2.

FIGS. 2 and 3 show the focal-plane shutter apparatus as disclosed in Japanese Utility Model Application Laid-open No. 63-45540, in which the vane group 18 is contained between the first plate 16 and the second plate 19.

In this focal-plane shutter apparatus, the first plate 16 is formed of a resin, and support shafts 17 of the vane group drive mechanism are integrally formed of the resin on the first plate 16.

Since the first plate 16 is made of the resin in such a focal-plane shutter apparatus, a reduction in weight of the focal-plane shutter apparatus may be attained.

There are, however, following problems recognized in such a focal-plane shutter apparatus, because the support shafts 17 of the vane group drive mechanism is integrally formed with the first plate 16 made of the resin. It is difficult to attain a sufficient precision, because a precision of relative position of the support shafts 17 is determined by a molding precision. It is also difficult to attain a sufficient precision because the relative position of the support shafts 17 changes depending upon a deformation due to a temperature of the first plate 16. Thus, an enough reliability cannot be provided for a high speed shutter apparatus requiring a specifically high precision.

Further, since the support shafts 17 are fixed to the first plate 16, members constituting the vane group drive mechanism have to be assembled about the support shafts 17, which is inferior in assembly operability of the vane group drive mechanism to the first plate 16 and which necessitates a great number of man-hours for assembly.

Also, in the conventional shutter apparatus, the shutter drive mechanism is assembled with reference to a support shaft or shutter drive shaft fixed on the first plate or shutter base plate, and a mirror drive mechanism and an aperture drive mechanism are assembled with reference to a mirror drive shaft fixed on the side face base plate forming the mirror box.

The mirror drive mechanism also serves as a shutter charge mechanism of the shutter drive mechanism. Thus, in assembly, the two drive mechanisms are assembled taking into consideration a relative position relation between them in operation.

In the conventional shutter apparatus, when the shutter drive mechanism is mounted on the shutter base plate, a mounting position of the shutter drive mechanism must be determined with respect to the center of optical axis. Also, when the mirror drive mechanism is mounted on the mirror box, a mounting position of the mirror drive mechanism must be determined with respect to a direction of a short side of the shutter base plate and to a direction of the optical axis.

In spite of a fact that the mirror drive mechanism also serves as the shutter charge mechanism of the shutter drive mechanism, the respective drive mechanisms are independently mounted onto the mounting base plate in assembly. Such assembly makes it difficult to achieve a desired precision of relative position between the two drive mechanisms, which makes the assembly operation of the apparatus very difficult and therefore consumes the time.

Further, preparing for a case that a slight deviation is caused in relative position of the two drive mechanisms, a space is necessary to absorb the deviation in operation of the drive mechanisms, in respect of designing of the mechanisms. Such a space is a hindrance for reduction in size of the apparatus, for reduction in energy to operate the drive mechanisms, and for reduction in operation time.

Further, the shutter apparatus must be arranged in structure such that the shutter drive shaft is perpendicular to the mirror drive shaft or the aperture drive shaft. However, in an apparatus in which the mirror box and the shutter base plate are integrally formed with each other as in one embodiment of the present invention, it is impossible that the two drive shafts are fixed on the mounting base plate perpendicular to each other. Thus, it is naturally impossible that the shatter drive mechanism and either the mirror drive mechanism or the aperture drive mechanism are individually mounted.

A slight deviation of mounting position of the shutter drive mechanism and either of the mirror drive mechanism and the aperture drive mechanism in the direction of optical axis and in the direction of a long side of the shutter base plate (in the horizontal direction) causes no substantial influence on a control upon actual driving of the shutter and either the mirror or the aperture.

It is because the drives of the shutter and either the mirror or the aperture are carried out in the direction of the short side of the shutter base plate (in the vertical direction). Therefore, the most important point in respect of the mounting position is a position in the vertical direction.

SUMMARY OF THE INVENTION

The present invention has been accomplished in order to solve such conventional problems. It is an object of the present invention to provide a focal-plane shutter apparatus which may greatly improve the precision and the assembling operability of the vane group drive mechanism, as compared to the conventional apparatuses.

It is another object of the present invention, which has been accomplished to solve such conventional problems, to provide a focal-plane shutter apparatus which may permit such as assembly thereof that when one of the drive mechanisms is set at a mounting position in one direction (in the vertical direction) the other drive mechanism is automatically determined at a mounting position thereof, and which may permit an assembly of the shutter drive mechanism and either the mirror drive mechanism or the aperture drive mechanism even in case of integral formation of the mirror box and the shutter base plate.

A focal-plane shutter apparatus according to the present invention comprises a shutter base plate or first plate located on a film-plane side of a mirror box; a second plate located on a film-plane side of the first plate; a third plate located on an opposite side of the first plate to the film-plane side thereof; a vane group comprising a plurality of light shielding thin plates contained between the first plate and the second plate; and a drive arm contained between the first plate and the second plate to drive the vane group; in which the third plate has a mount portion which is to be fixed to the first plate, a shaft fixed to the third plate, a shutter drive lever rotatably fit to the shaft at one end and connected to the drive arm at an other end, and an urging device for urging the shutter drive lever in a direction of drive of the vane group; and in which the first plate has a support portion to support the one end of the shaft and a hole portion for transmitting a displacement of the shutter drive lever to the drive arm.

In the focal-plane shutter apparatus of the present invention, the shaft, which may be for example support shafts, is fixed on the third plate, and the shutter drive lever and the urging device are located with respect to the shaft.

Further, the third plate is fixed through the mount portion to the first plate, and one end of the each shaft is supported by the support portion of the first plate. The shutter drive lever is inserted into the hole portion of the first plate, and then connected to the drive arm.

In a focal-plane shutter apparatus of another embodiment, the first plate is integrally formed with the mirror box.

In a focal-plane shutter apparatus of still another embodiment, the first plate and the mirror box are made of a resin.

In a focal-plane shutter apparatus of still another embodiment, the third plate is made of a substance more resistant to deformation than that of the first plate.

In a focal-plane shutter apparatus of still another embodiment, the third plate is made of a metal, and the first plate is made of a resin.

In a focal-plane shutter apparatus of still another embodiment, the shaft penetrates the first plate, and the drive arm is journaled on the shaft.

A focal-plane shutter apparatus of still another embodiment comprises a shutter base plate or first plate located on a film-plane side of a mirror box, normal to a side face of the mirror box which is parallel to a direction of an optical axis; a third plate located on an opposite side of the first plate to a film-plate side thereof; a shutter drive shaft located normal to the first plate; a shutter drive lever journaled on the shutter drive shaft to drive the shutter; a mirror drive shaft located normal to the side face of the mirror box; and a mirror drive lever journaled on the mirror drive shaft to drive a mirror; in which the shutter drive shaft and the mirror drive shaft are fixed to the third plate perpendicular to each other; and in which, when the third plate is fixed to the first plate, the shutter drive lever is positioned at a position where the shutter drive lever drives the shutter and the mirror drive lever is positioned at a position where the mirror drive lever drives the mirror.

A focal-plane shutter apparatus of still another embodiment comprises an aperture drive shaft located normal to the side face of the mirror box; and an aperture drive mechanism engaged with the aperture drive shaft and provided with an aperture drive lever for driving an aperture; in which the shutter drive shaft and the aperture drive shaft are fixed to the third plate perpendicular to each other; and in which, when the third plate is fixed to the first plate, the shutter drive lever is positioned at a position where the shutter drive lever drives the shutter and the aperture drive lever is positioned at a position where the aperture drive lever drives the aperture.

DESCRIPTION OF THE PREFERRED EMBODIMENTS

Embodiments of the present invention will be explained in detail with reference to the accompanying drawings.

Figure 4:
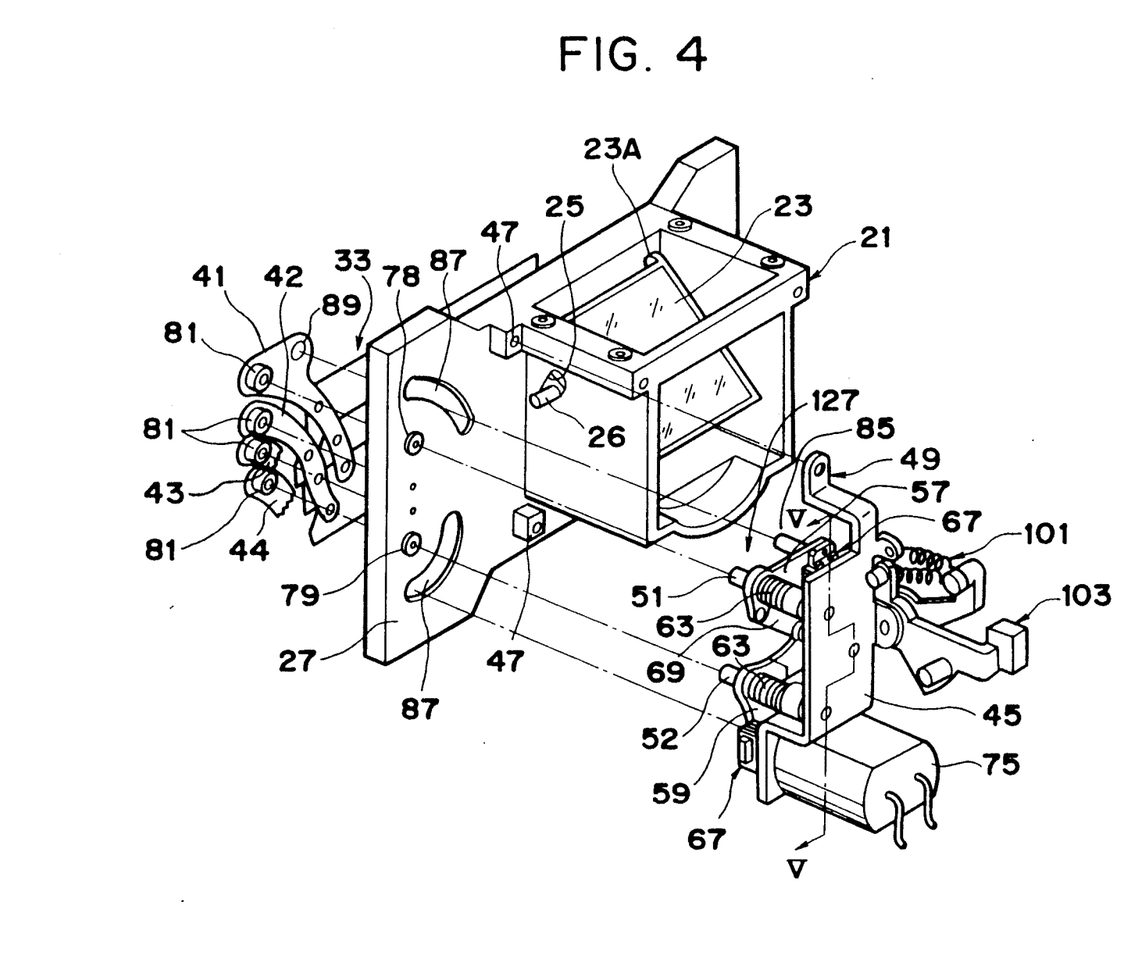
FIG. 4 is a perspective view to show one embodiment of a focal-plane shutter apparatus according to the present invention.
Figure 5:
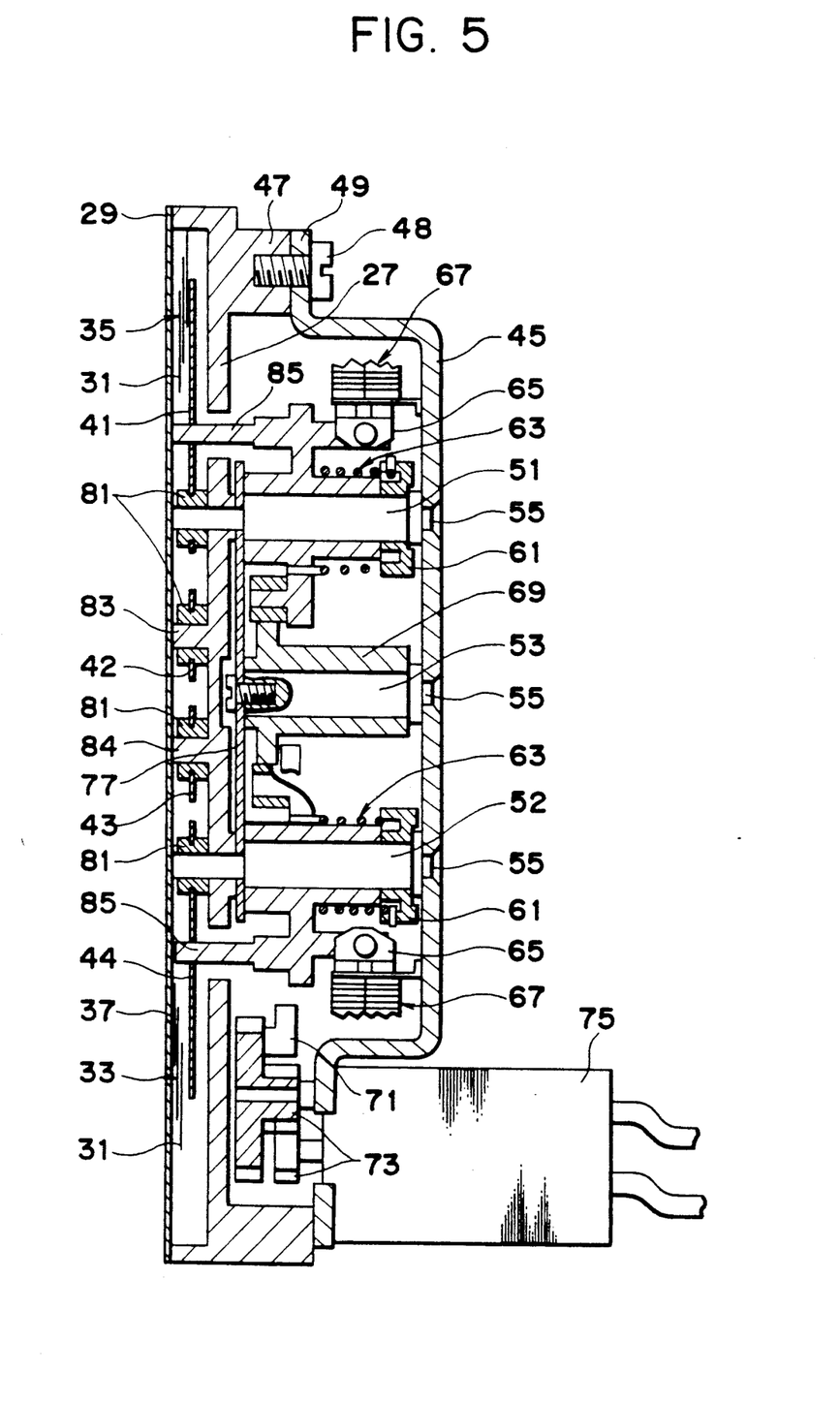
FIG. 5 is a cross-sectional view along V—V line of the focal-plane shutter apparatus of FIG. 4.
Figure 6:
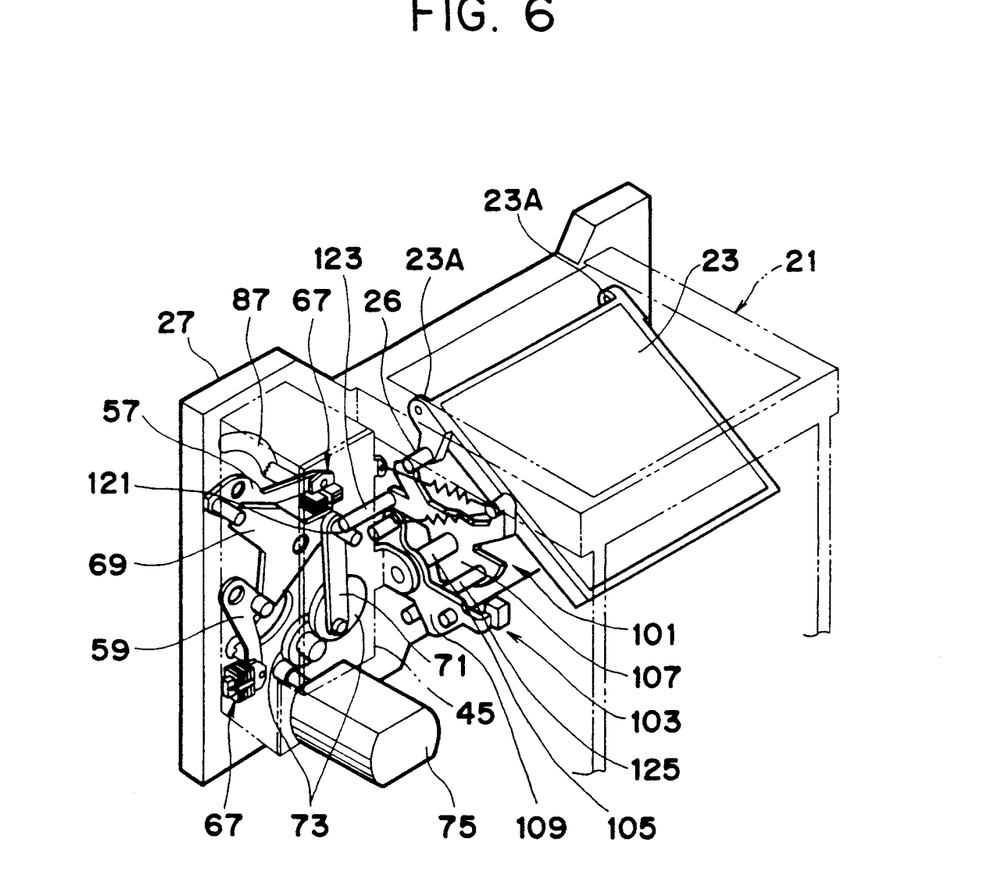
FIG. 6 is a perspective view to show an assembled state of the focal-plane shutter apparatus of FIG. 4.

FIGS. 4 to 6 show an embodiment of a focal-plane shutter apparatus according to the present invention. In FIG. 4, numeral 21 denotes a mirror box.

A movable mirror 23 is contained movably about an upper portion 23A in the mirror box 21. The movable mirror 23 is structured to rotate by moving a mirror rotation pin 26 inserted into a drive hole 25.

A shutter base plate or first plate 27 is located on an unrepresented film-plane side of the mirror box 21.

The first plate 27 and the mirror box 21 are integrally formed of a resin.

A second plate 29, which is made for example of a metal, is located at a predetermined spacing from the first plate 27 on an unrepresented film-plane side of the first plate 27, as shown in FIG. 5.

A vane group 33 comprising a plurality of light shielding thin plates 31 is contained between the first plate 27 and the second plate 29.

The vane group 33 is constituted by a leading curtain group 35 and a trailing curtain group 37.

Drive arms 41, 42, 43, 44 to drive the vane group 33 are located between the first plate 27 and the second plate 29. The drive arms 41, 42, 43, 44 are connected to the vane group 33 for example by caulking.

In this embodiment, the drive arms 41, 42 drive the leading curtain group 35, and the drive arms 43, 44 do the trailing curtain group 37.

A third plate 45, which is made for example of a metal such as iron, is located at a predetermined spacing on an opposite side of the first plate 27 to the unrepresented film-plane side thereof.

Formed on the third plate 45 is a mount portion 49 for securing the third plate 45 to a fixing portion 47 of the first plate 27 by screws 48.

Shutter drive shafts 51, 52 and a charge cam shaft 53, which are support shafts, are located on the third plate 45.

The shutter drive shafts 51, 52 and the charge cam shaft 53 are secured by caulking 55 to the third plate 45 at respective one ends thereof.

Shutter drive levers 57, 59 are rotatably fit onto the shutter drive shafts 51, 52.

There are located urging devices 63, each of which comprises a drive spring, for urging the shutter drive levers 57, 59 in a direction of drive of the vane group 33 between the shutter drive levers 57, 59 and engagement collars 61.

An iron piece 65 is disposed on each of the shutter drive levers 57, 59. The shutter drive levers 57, 59 are held by drawing and sticking the iron pieces 65 to an electromagnets 67.

A charge cam 69 for charging the shutter drive levers 57, 59 is rotatably fit onto the charge cam shaft 53.

The charge cam 69 is so arranged that a rotation of a motor 75 is transmitted through a connecting lever 71 forming a link and through a gear 73 to the charge cam 69.

The other ends of the shutter drive shafts 51, 52 pass through drive shaft holes 78, 79 formed in a top plate 77 and the first plate 27, and are then inserted into rotation center holes 81 of the drive arms 41, 44.

Further, second shutter drive shafts 83, 84 are integrally formed on the first plate 27. The second shutter drive shafts 83, 84 are inserted into respective rotation center holes 81 of the drive arms 42, 43.

Lever shafts 85 are integrally formed on the shutter drive levers 57, 59. The lever shafts 85 are inserted into arch holes 87 formed on the first plate 27, and further inserted into through holes 89 formed on the drive arms 41, 44 as to transmit a displacement of the shutter drive levers 57, 59 to the drive arms 41, 44.

In FIGS. 4 and 6, numeral 101 denotes a mirror drive mechanism, and numeral 103 an aperture drive mechanism.

The mirror drive mechanism 101 has a mirror/aperture drive shaft 105 disposed normal to a side face of the mirror box 21, and a mirror drive lever 107 journaled on the mirror/aperture drive shaft 105 to drive the mirror 23.

The shutter drive shaft 51 and the mirror/aperture drive shaft 105 are fixed to the third plate 45 perpendicular to each other. When the third plate 45 is secured to the first plate 27, the shutter drive lever 57 is positioned at a position where the shutter drive lever 57 drives the shutter and the mirror drive lever 107 is positioned at a position where the mirror drive lever 107 drives the mirror 23.

The aperture drive mechanism 103 is engaged with the aforementioned mirror/aperture drive shaft 105 and provided with an aperture drive lever 109 for driving an unrepresented aperture. When the third plate 45 is secured to the first plate 27, the shutter drive lever 57 is located at a position where the shutter drive lever 57 drives the shutter and the aperture drive lever 109 is located at a position where the aperture drive lever 109 drives the aperture.

In the focal-plane shutter apparatus as structured, when an unrepresented release button is fully pressed, the motor 75 rotates, the charge cam 69 retreats, and the movable mirror 23 moves up. After that, the electromagnets 67 are turned off, so that the iron pieces 65 of the shutter drive levers 57, 59 are released from the holding by the electromagnets 67. Then, the shutter drive levers 57, 59 are rotated by an urging force of the urging devices 63. The rotation of the shutter drive levers 57, 59 is transmitted through the lever connecting portions 85 to the drive arms 41, 44 to drive the vane group 33.

After the end of drive of the vane group 33, the motor 75 is driven. The charge cam 69 is rotated through the gear 73 and the connecting lever 71 by the drive of the motor 75. The rotation of the charge cam 69 rotates the shutter drive levers 57, 59 in a reverse direction to the urging direction by the urging devices 63, so that the iron pieces 65 of the shutter drive levers 57, 59 are brought to a position where they stick to the electromagnets 67 at a top dead point of the charge cam 69, and held there.

When the connecting lever 71 rotates, the mirror drive lever 107 is rotated through pin members 121, 123 about the mirror/aperture drive shaft 105. The mirror rotation pin 26 is rotated by the mirror drive lever 107 to move the mirror 23.

When the mirror drive lever 107 further rotates, the aperture drive lever 109 rotates through a pin member 125 fixed to the mirror drive lever 107 about the mirror/aperture drive shaft 105. The unrepresented aperture is then driven by the aperture drive lever 109.

Accordingly, in the focal-plane shutter apparatus thus structured, the shutter drive shaft 51 of the shutter drive mechanism 127 and the mirror/aperture drive shaft 105 of the mirror drive mechanism 101 are arranged on the common plate 45 to have a predetermined positional relation in the direction of the short side of the first plate 27 (in the vertical direction), that is, to have such a positional relation that when the shutter drive mechanism 127 is mounted the mirror drive mechanism 101 is located at a position where the mirror drive mechanism 101 may drive the mirror 23. Thus, provided that a mount position of one of the drive mechanisms is precisely determined in the vertical direction, the other of the drive mechanisms may be mounted at an accurate mount position in the vertical direction. The assembling operability is greatly improved thereby, as compared to the conventional apparatuses.

Further, the shutter drive shaft 51 of the shutter drive mechanism 127 and the mirror/aperture drive shaft 105 of the aperture drive mechanism 103 are arranged on the common third plate 45 to have a predetermined positional relation in the direction of the short side of the first plate 27 (in the vertical direction), that is, to have such a positional relation that when the shutter drive mechanism 127 is mounted the aperture drive mechanism 103 is located at a position where the aperture drive mechanism 103 may drive the aperture. Thus, provided that a mount position of one of the drive mechanism is precisely determined in the vertical direction, the other of the drive mechanisms may be mounted at an accurate mount position in the vertical direction.

The assembling operability is greatly improved thereby, as compared to the conventional apparatuses.

Further, since one charge mechanism is preliminarily arranged on the common third plate 45 to be used for the shutter drive mechanism 127 and also for the mirror drive mechanism 101 and the aperture drive mechanism 103, the positional relation among the drive mechanisms does not have to be adjusted in mounting.

Also, the shutter drive shaft 51 and the mirror/aperture drive shaft 105 are so arranged on the common third plate 45 as to be perpendicular to each other in the direction of optical axis as well as in the direction of the long side of the shutter base plate 27 (in the horizontal direction). By this arrangement, once the vertical mounting positions of the respective drive mechanisms are determined and the respective drive mechanisms are brought into respective engagements with the shutter and with either the mirror or the aperture, and even if the mount positions of the respective drive mechanisms are slightly deviated in the optical axis direction and in the horizontal direction, actual drive amounts and drive directions of the shutter and of either the mirror or the aperture may be accurately transmitted.

Further, in the focal-plane shutter apparatus thus structured, the support shafts such as the shutter drive shafts 51, 52 and the charge cam shaft 53 are fixed on the third plate 45, the shutter drive levers 57, 59, the urging devices 63 and the like are located about the shafts, the third plate 45 is fixed to the first plate 27 through the mounting portion 49, the respective one ends of the shutter drive shafts 51, 52 are supported by the support portions 78, 79 of the first plate 27, the lever shafts 85 of the shutter drive levers 57, 59 are inserted into the holes 87 of the first plate 27, and the lever shafts 85 are connected to the drive arms 41, 44, whereby the accuracy and the assembling operability of the vane group drive mechanism may be greatly improved as compared to the conventional apparatuses.

In other words, the support shafts such as the shutter drive shafts 57, 59 and the charge cam shaft 53 are fixed to the third plate 45 in this focal-plane shutter apparatus, so that the precision of the relative position among them may not be affected by the molding precision of the first plate 27, or, by a thermal deformation or the like of the first plate 27, whereby the precision of the vane group drive mechanism may be greatly improved as compared to the conventional apparatuses.

Also, it becomes possible that the third plate 45 is fixed to the first plate 27 after a main part of the vane group drive mechanism is assembled to the third plate 45, whereby the assembling operability may be greatly improved as compared to the conventional apparatuses.

further, in this embodiment, the support shafts such as the shutter drive shafts 51, 52 and the charge cam shaft 53 are fixed to the third plate 45, and a drop-off of the shutter drive levers 57, 59, the charge cam 69, or the like may be prevented by the top plate 77, whereby the main part of the vane group drive mechanism may be independently assembled to the third plate 45 in a secure manner.

Also, in the focal-plane shutter apparatus as described above, the first plate 27 is integrally formed with the mirror box 21, so that the strength of the first plate 27 may be improved, whereby the precision of the vane group drive mechanism may be more improved.

Further, the first plate 27 and the mirror box 21 are made of a resin, so that the apparatus may be reduced in weight.

Also, since the third plate 45 is made of a material, for example a metal, more resistant to deformation than that of the first plate 27, the precision of the vane group drive mechanism may be improved.

Further, the shutter drive shafts 51, 52 are located to penetrate the first plate 27, and the drive arms 41, 44 are journaled on the shutter drive shafts 51, 52, whereby the precision of the vane group drive mechanism and the assembling operability may be greatly improved as compared to the conventional apparatuses.

Figure 7:
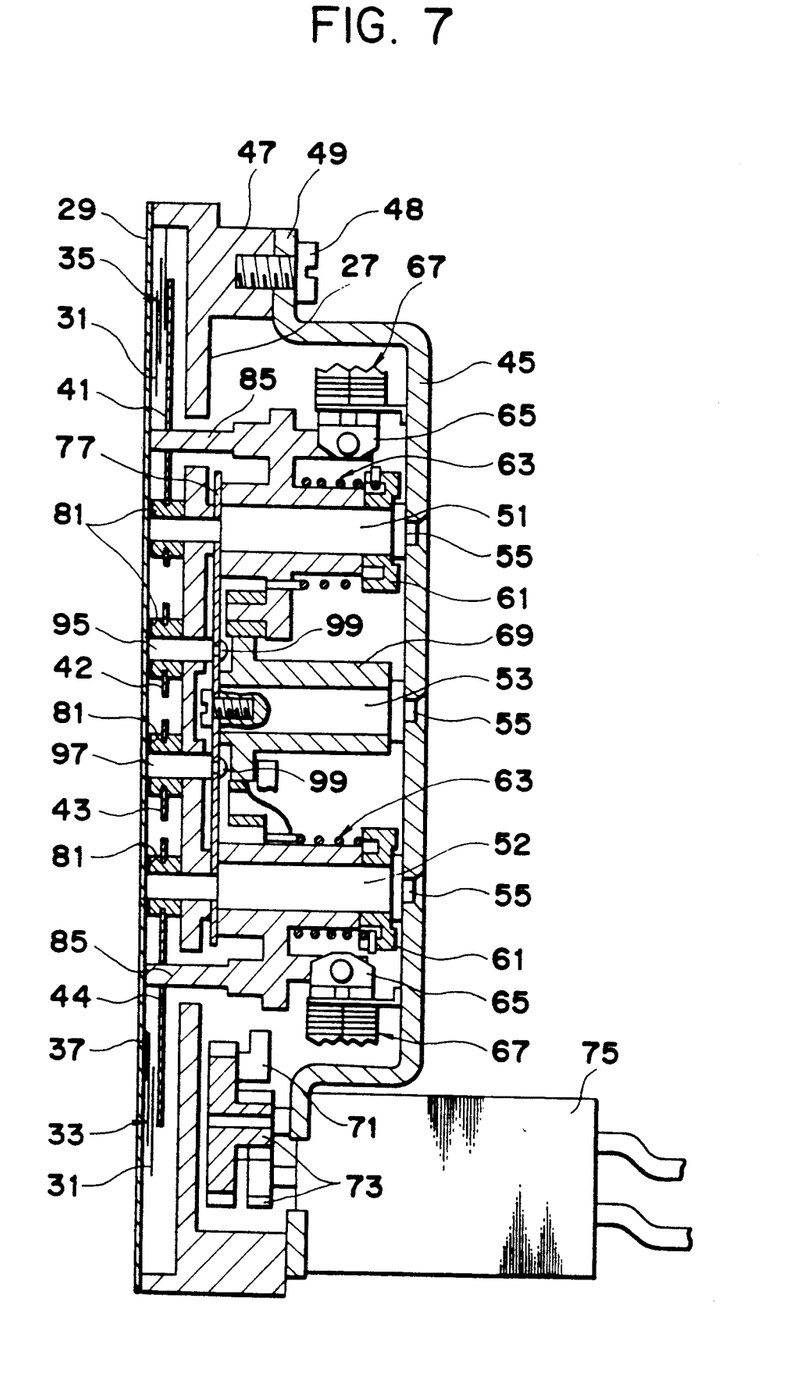
FIG. 7 is a cross-sectional view to show another embodiment of the focal-plane shutter apparatus according to the present invention.

FIG. 7 shows another embodiment of the present invention. In this embodiment, second shutter drive shafts 95, 97 are secured by screws 99 to the top plate 77.

The focal-plane shutter apparatus of this embodiment may also enjoy the same merits and advantages as the above-described embodiment. In this embodiment, the second shutter drive shafts 95, 97 are secured by the screws 99 to the top plate 77, so that the second shutter drive shafts do not have to be formed on the first plate 27, whereby the precision of the vane group drive mechanism and the assembling operability may be improved.

In the focal-plane shutter apparatus of the present invention, the shafts, for example the support shafts, are fixed to the third plate, the shutter drive levers and the urging devices are located about the shafts, the third plate is secured to the first plate at the mount portion, respective one ends of the shafts are supported by the support portion of the first plate, the shutter drive levers are inserted into the hole portion of the first plate, and the shutter drive levers are connected to the drive arms, whereby the precision of the vane group drive mechanism and the assembling operability may be greatly improved as compared to the conventional apparatuses.

In the focal-plane shutter apparatus of another embodiment, the first plate is integrally formed with the mirror box, so that the strength of the first plate may be improved, whereby the precision of the vane group drive mechanism may be improved.

In the focal-plane shutter apparatus of still another embodiment, the first plate and the mirror box are formed of a resin, so that the apparatus may be reduced in weight.

In the focal-plane shutter apparatus of still another embodiment, the third plate is formed of a substance more resistant to deformation than that of the first plate, whereby the precision of the vane group drive mechanism may be improved.

In the focal-plane shutter apparatus of still another embodiment, the third plate is formed of a metal, and the first plate is made of a resin, whereby the precision of the vane group drive mechanism may be improved and the apparatus may be reduced in weight.

In the focal-plane shutter apparatus of still another embodiment, the shafts are located to penetrate the first plate, and the drive arm is journaled on the shaft, whereby such an advantage may be enjoyed that the precision of the vane group drive mechanism and the assembling operability may be greatly improved as compared to the conventional apparatuses.

In the focal-plane shutter apparatus of still another embodiment, the shutter drive mechanism and either the mirror drive mechanism or the aperture drive mechanism are arranged on the common shutter base plate or first plate to have a predetermined positional relation in the direction of the short side of the first plate (in the vertical direction), that is, to have such a positional relation that when the shutter drive mechanism is mounted the mirror drive mechanism or the aperture drive mechanism is located at a position where the mirror drive mechanism or the aperture drive mechanism may drive the mirror or the aperture. Thus, provided that a mount position of one of the drive mechanism is precisely determined in the vertical direction, the other of the drive mechanisms may be mounted at an accurate mount position in the vertical direction. The assembling operability is greatly improved thereby, as compared to the conventional apparatuses.

Further, since one charge mechanism is preliminarily arranged on the common third plate to be used for the shutter drive mechanism and also for the mirror drive mechanism and the aperture drive mechanism, the positional relation among the drive mechanisms does not have to be adjusted in mounting.

Also, the shutter drive shafts of the drive mechanisms are so arranged on the common third plate as to be perpendicular to each other in the direction of optical axis and in the direction of the long side of the shutter base plate (in the horizontal direction). By this arrangement, once the vertical mounting positions of the respective drive mechanisms are determined and the respective drive mechanisms are brought into respective engagements with the shutter and with either the mirror or the aperture, and even if the mount positions of the respective drive mechanisms are slightly deviated in the optical axis direction and in the horizontal direction, actual drive amounts and drive directions of the shutter and of either the mirror or the aperture may be accurately transmitted.

What is claimed is:

1. A focal-plane shutter apparatus comprising:
    a first plate located on a film-plane side of a mirror box;
    a second plate located on a film-plane side of said first plate;
    a third plate located on an opposite side of said first plate to the film-plane side thereof;
    a vane group comprising a plurality of light shielding thin plates contained between said first plate and said second plate;
    a drive arm contained between said first plate and said second plate to drive said vane group;
    said third plate having a mount portion which is to be fixed to said first plate, a shaft fixed to said third plate, a shutter drive lever rotatably fit to said shaft at one end and connected to said drive arm at an other end, and urging means for urging said shutter drive lever in a direction of drive of said vane group; and
    said first plate having a support portion to support said one end of said shaft and a hole portion for transmitting a displacement of said shutter drive lever to said drive arm.

2. A focal-plane shutter apparatus according to claim 1, wherein said first plate is integrally formed with said mirror box.

3. A focal-plane shutter apparatus according to claim 1, wherein said first plate and said mirror box are made of a resin.

4. A focal-plane shutter apparatus according to claim 1, wherein said third plate is made of a substance more resistant to deformation than that of said first plate.

5. A focal-plane shutter apparatus according to claim 4, wherein said third plate is made of a metal and wherein said first plate is made of a resin.

6. A focal-plane shutter apparatus according to claim 1, wherein said shaft penetrates said first plate to support said drive arm journaled thereon.

7. A focal-plane shutter apparatus comprising:
    a shutter base plate located on a film-plane side of a mirror box, normal to a side face of the mirror box which is parallel to a direction of an optical axis;
    a plate located on an opposite side of said shutter base plate to a film-plate side thereof;
    a shutter drive shaft located normal to said shutter base plate;
    a shutter drive lever journaled on said shutter drive shaft to drive the shutter;
    a mirror drive shaft located normal to said side face of the mirror box;
    a mirror drive lever journaled on said mirror drive shaft to drive a mirror;
    said shutter drive shaft and said mirror drive shaft being fixed to said plate perpendicular to each other; and
    said plate being fixed to said shutter base plate such that said shutter drive lever is positioned at a position where the shutter drive lever drives said shutter and that said mirror drive lever is positioned at a position where the mirror drive lever drives said mirror.

8. A focal-plane shutter apparatus according to claim 7, further comprising:
    an aperture drive shaft located normal to said side face of the mirror box;
    an aperture drive mechanism engaged with said aperture drive shaft and provided with an aperture drive lever for driving an aperture;
    said shutter drive shaft and said aperture drive shaft being fixed to said plate perpendicular to each other; and
    said plate being fixed to said shutter base plate such that said shutter drive lever is positioned at a position where the shutter drive lever drives said shutter and that said aperture drive lever is positioned at a position where the aperture drive lever drives said aperture.

9. A focal-plane shutter apparatus according to claim 7, wherein said shutter base plate is integrally formed with said mirror box.

* * * * *